Figure 1:
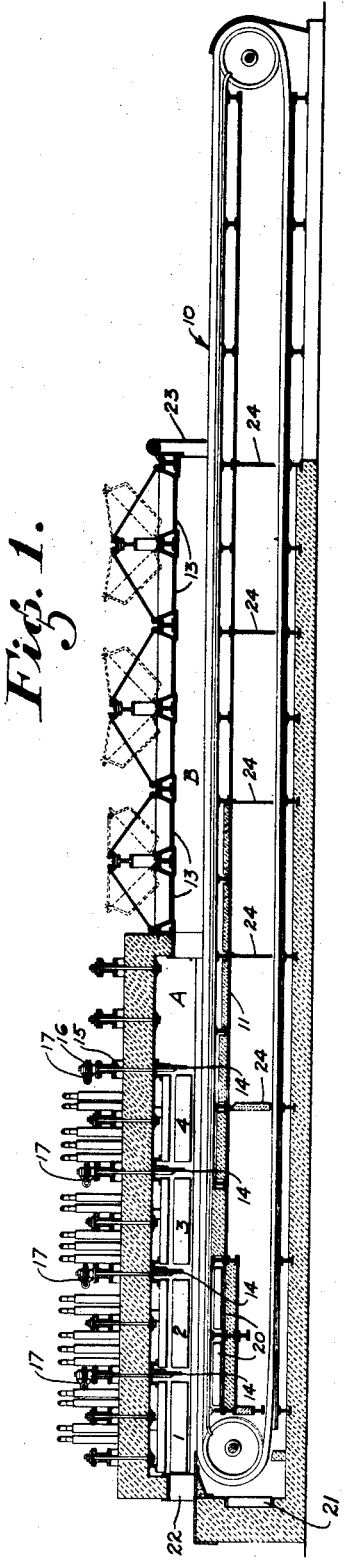

Jan. 31, 1928.

K. M. HENRY ET AL 1,657,797

GLASS ANNEALING LEER

Filed Dec. 4, 1924

2 Sheets-Sheet 1

Inventors.
Kenneth M. Henry.
Payson D. Burtt.

By
Dewey, Strong, Townsend & Loftus
Attorneys.

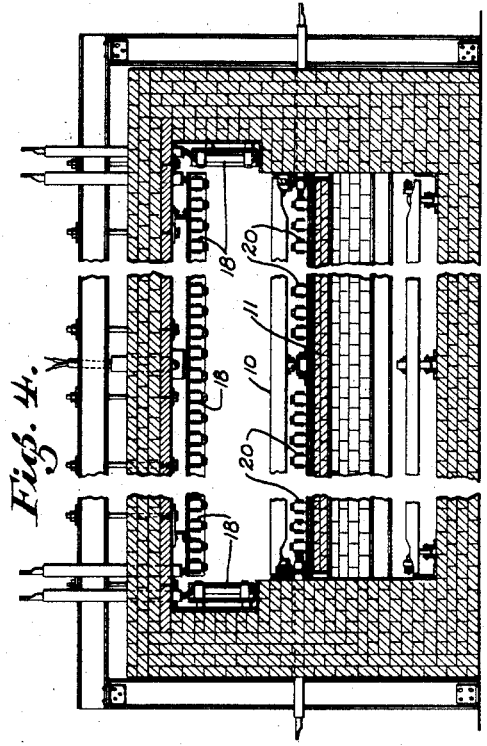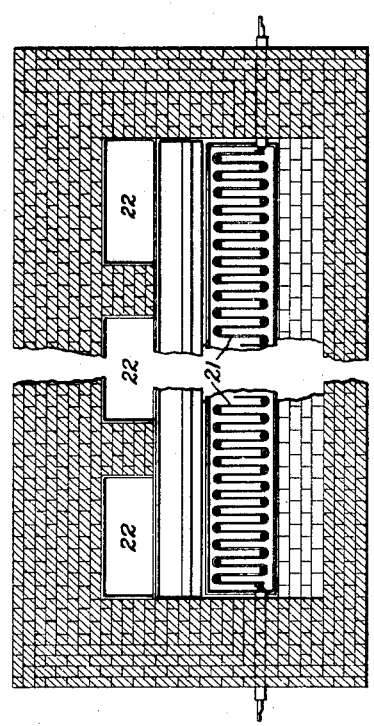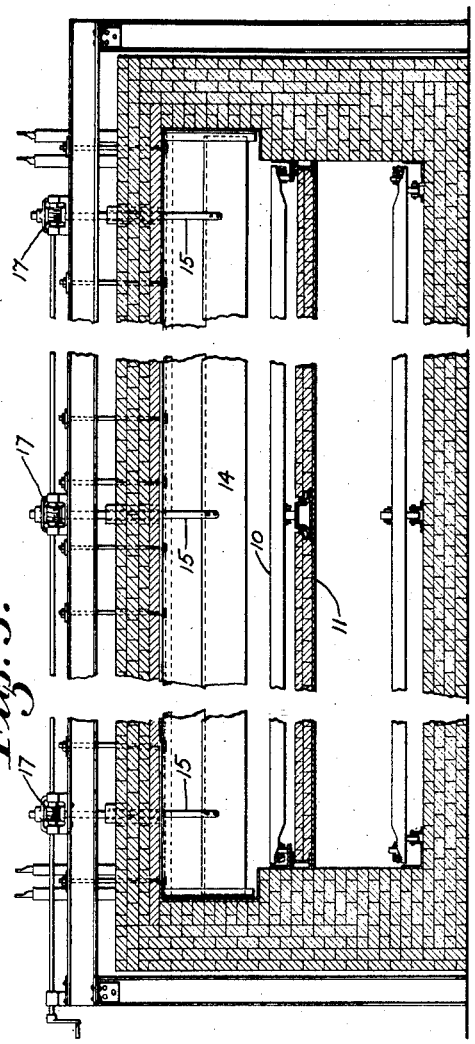

Patented Jan. 31, 1928.

1,657,797

UNITED STATES PATENT OFFICE.

KENNETH M. HENRY AND PAYSON D. BURTT, OF SAN FRANCISCO, CALIFORNIA, ASSIGNORS TO ILLINOIS PACIFIC GLASS CORPORATION, A CORPORATION OF DELAWARE.

GLASS-ANNEALING LEER.

Application filed December 4, 1924. Serial No. 753,789.

This invention relates to glass-annealing leers, and has for its object to provide a leer wherein the temperature can be accurately and automatically controlled in and throughout the various sections of the leer, and wherein the temperature may be made to follow a predetermined curve with little or no fluctuation.

For properly annealing glass, it is desirable that the maximum temperature be reached as quickly as possible after the articles are introduced in the leer. Ordinarily, the hotter the temperature to which the glass is annealed, the shorter will be the time required for removing all strains from the glass. Having removed all strains and stresses at a high temperature, the problem remaining is to regulate carefully the cooling of the glass articles, so as to reduce the time element and prevent reverse strains from being imparted to the glass, due to rapid cooling. The advantages of ascertaining in advance the correct annealing curve for a particular kind of glass are made clear in the co-pending application of Kenneth M. Henry, Serial Number 593,902, filed October 11, 1922, now Patent 1,540,264, entitled "Process of annealing glass". However, the leers heretofore in use have not been capable of exact regulation such as is necessary to faithfully follow the desired annealing curve. Our experiments have shown that this can be done successfully only by means of an electrically heated leer; and while it has been proposed heretofore to anneal glassware in electrically heated leers, we are not aware that any leer has been constructed wherein a high heat may be applied quickly after the glassware enters the leer and the temperatures in the different parts of the leer are subject to exact regulation and control, to the extent required for correct and economical annealing of glassware. The proper construction of such a leer requires a division of the leer into a heating chamber and a cooling chamber, the heating chamber in turn being divided into zones or sections which are more or less isolated from each other, and have their own electric heating elements automatically controlled by a temperature-responsive device located within that zone, and set to maintain a predetermined temperature. It is also important that the heating elements be so disposed as to provide the desired temperature throughout all parts of the zone, and provision should be made for preventing circulation of convection currents within or between the various zones, which would tend to interfere with the exact regulation of the heat.

Figure 2:
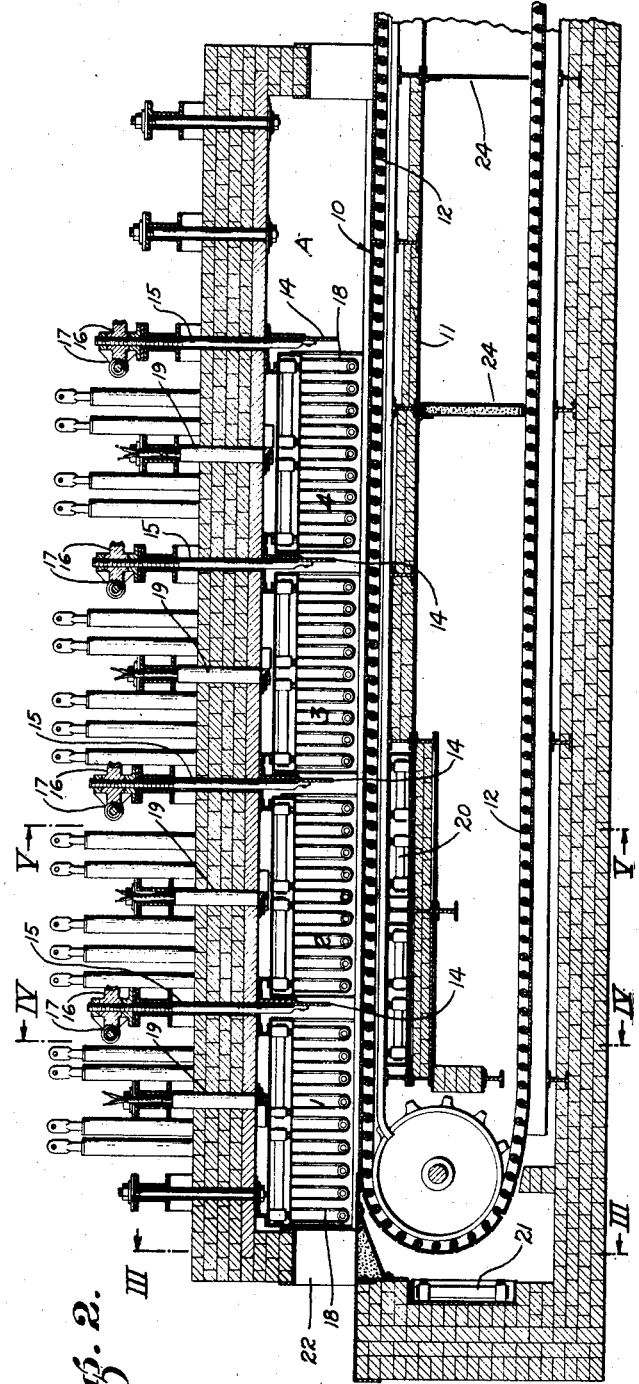

One form which our invention may assume is exemplified in the following description and illustrated in the accompanying drawings, in which Fig. 1 shows a vertical longitudinal central sectional view of a leer embodying our invention;

Fig. 2 shows a similar view of the forward portion of said leer;

Fig. 3, Fig. 4, and Fig. 5 show cross-sections of the leer, taken on the lines III—III, IV—IV, and V—V, respectively, of Fig. 2.

The leer herein shown includes a furnace structure having a tunnel extending from end to end, and fitted with an endless conveyor 10. Between the upper and lower runs of the conveyor we preferably arrange a horizontal partition 11, so that the portion of the tunnel above the upper run is isolated from the portion of the tunnel containing the lower or return flight of the conveyor. The conveyor is made up of plates 12 hinged together as shown in the patent to Kenneth M. Henry, Number 1,507,832, issued September 9, 1924, so that no spaces or cracks are present to permit passage of air currents between the hinged sections of the conveyor. The space above the conveyor is divided into a heating chamber A and a cooling section B. The roof of the heating chamber is preferably of brickwork and entirely closed, whereas the roof of the cooling section is provided with hinged doors 13, which may be opened or closed more or less, to afford such ventilation as may be required to bring about the desired rate of cooling.

The heating chamber of the leer is divided into a plurality of sections or zones, there being four shown in the present instance, marked 1, 2, 3, and 4, respectively. These sections are separated from each other by gates 14, which can be raised or lowered so as to clear different sizes of glassware. The particular raising and lowering means herein shown includes a plurality of rods 15 for each gate, extending up through the roof of the furnace and threaded into feed nuts 16, which latter are driven by suitable worm gearing 17.

The heating elements in each section are preferably in the form of ribbons 18 of nichrome. They are disposed at each side and across the roof, so as to apply their heat uniformly to all parts of the zone or section. All the heating elements in each section and zone have their own operating circuit, which circuit is controlled or regulated by means of a thermo-couple 19 extending down through the roof of the furnace, and disposed at a central point within the section or zone which it is intended to control. In practice, each thermo-couple is operatively connected to a potentiometer.

Beneath the upper run of the conveyor, and near the front end of the latter, are heating elements 20, similar to the elements 18, but preferably not automatically controlled. The function of these manually controlled heating elements is to apply heat directly to the returning portion of the conveyor, particularly when small ware is being annealed, which ware has a tendency to lose considerable heat in being transferred from the mold to the leer. Similar heating elements 21 may be placed in the front wall of the furnace, facing the end of the conveyor, to assist in heating the returning portion of said conveyor.

At the front end of the leer is a charging opening 22, fitted with a suitable gate or door, and at the rear end of the cooling section is a flap 23, to cover the outlet and prevent circulation of air currents therethrough. Also, in the space between the partition 11 and the lower run of the conveyor, we arrange at suitable intervals vertical partition plates 24, to prevent any drafts that might otherwise be created therein.

The present design of leer is intended to accomplish the following:

Zone 1 is so equipped as to raise the temperature of the glass from about 700° Fahrenheit to 1,000° Fahrenheit, or more; zone 2 is so arranged as to maintain this temperature of approximately 1,000° Fahrenheit; zone 3 provides for a reduction in temperature from about 1,000° Fahrenheit to 850° Fahrenheit; and zone 4 provides a further reduction in temperature from 850° Fahrenheit to 600° Fahrenheit. Each of these zones is about four feet in length, and the travel of the conveyor is such as to require about fifteen minutes' time to traverse each zone. After the glassware leaves zone 4, cooling is carried on with progressively increasing rapidity, and the rate of cooling can be varied by means of the hinged doors 13. Ordinarily the doors are closed when small ware is being annealed, as otherwise the cooling would be so rapid as to impart reverse strains to the glass, although the danger of this is slight at any temperature below 600° Fahrenheit.

Various changes in the construction and arrangement of the several parts herein shown may be employed without departing from the spirit of our invention as disclosed in the appended claims.

What we claim as new and desire to secure by Letters Patent is:

1. A glass-annealing leer, comprising a furnace structure having a horizontally extending tunnel, an endless conveyor therein for moving glass articles through the tunnel, the space above the upper run of the conveyor being divided into a heating section and a cooling section, said heating section being provided with means to subdivide it into a plurality of zones, electric heating elements on the sides and roof of each of said zones, and a temperature responsive device in each zone electrically connected with the heating elements therein for automatically maintaining a predetermined temperature therein, and partition means between the upper and lower runs of the conveyor.

2. A glass-annealing leer, comprising a furnace structure having a horizontally extending tunnel, an endless conveyor therein for moving glass articles through the tunnel, the space above the upper run of the conveyor being divided into a heating section and a cooling section, said heating section being provided with means to subdivide it into a plurality of zones, electric heating elements in each of said zones, and a temperature-responsive device in each zone electrically connected with the heating elements therein for automatically manitaining a predetermined temperature therein, and means for regulating the rate of cooling of the glassware in the cooling section.

3. A glass-annealing leer, comprising a furnace structure having a horizontally extending tunnel, an endless conveyor therein for moving glass articles through the tunnel, the space above the upper run of the conveyor being divided into a heating section and a cooling section, said heating section being provided with means to subdivide it into a plurality of zones, electric heating elements in each of said zones, and a temperature-responsive device in each zone electrically connected with the heating elements therein for automatically maintaining a predetermined temperature therein, and electric heating devices arranged adjacent the conveyor, near the front end thereof, for heating the returning portion of the conveyor.

4. A glass-annealing leer, comprising a furnace structure having a horizontally extending tunnel, an endless conveyor therein for moving glass articles through the tunnel, the space above the upper run of the conveyor being divided into a heating section and a cooling section, said heating section being provided with means to subdivide it into a plurality of zones, electric heating elements in each of said zones, and a temperature-responsive device in each zone electrically connected with the heating elements therein for automatically maintaining a predetermined temperature therein, and means for preventing passage of air currents between the space above the upper run of the conveyor and the space below.

5. A glass-annealing leer, comprising a furnace structure having a longitudinally extending tunnel, an endless conveyor therein for moving glass articles through the tunnel, the space above the upper run of the conveyor being divided into a heating section and a cooling section, adjustable means for subdividing said heating section into a plurality of zones, electric heating elements in each zone, arranged at the sides and across the top thereof, and means in each zone, electrically connected to said heating elements and responsive to temperature changes, for automatically maintaining a predetermined temperature therein.

6. A glass-annealing leer, comprising a furnace structure having a longitudinally extending tunnel, an endless conveyor therein for moving glass articles through the tunnel, the space above the upper run of the conveyor being divided into a heating section and a cooling section, a plurality of vertically disposed gates depending from the roof of the heating chamber for dividing the same into separate zones, means operable from the exterior of the furnace for raising and lowering said gates, electric heating elements arranged in each zone, and means responsive to temperature changes arranged in each zone, and electrically connected with the heating elements therein for maintaining a predetermined temperature in such zone.

7. A glass-annealing leer, comprising a furnace structure having a longitudinally extending tunnel, an endless conveyor therein for moving glass articles through the tunnel, the space above the upper run of the conveyor being divided into a heating section and a cooling section, and the heating section in turn being provided with means to subdivide it into zones, electrical heating means in the form of ribbons, disposed at each side and across the roof of the heating chamber in each of the different zones, the heating elements in each zone having an individual operating circuit, and means in each zone, electrically connceted with the heating elements therein, and responsive to temperature changes, whereby to automatically control the circuit.

KENNETH M. HENRY.
PAYSON D. BURTT.